_United States Patent_ [19]

Enders

[11] 4,283,091

[45] Aug. 11, 1981

[54] SHOCK PROOF FASTENER ASSEMBLY FOR VEHICLE WHEELS AND OTHER APPLICATIONS

[76] Inventor: Max L. Enders, 965 N. Fair Oaks Ave., Pasadena, Calif. 91103

[21] Appl. No.: 912,566

[22] Filed: Jun. 5, 1978

Related U.S. Application Data

[63] Continuation-in-part of Ser. No. 623,578, Oct. 20, 1975, abandoned.

[51] Int. Cl.³ .............................................. B60B 3/16
[52] U.S. Cl. ........................... 301/9 DN; 301/36 R; 301/63 R; 403/371; 403/372; 411/83; 411/116; 411/131; 411/135; 411/144; 411/155; 411/160; 411/395
[58] Field of Search ................. 301/9 DN, 9 R, 9 SB, 301/9 AN, 9 DP, 111, 114, 117, 36 R, 36 WP, 63 R, 105 R; 403/370–372, 374, 408, 337; 85/50 C, 4; 151/34–35, 37, 40, 19 R, 19 A, 41.75, 69

[56] References Cited

U.S. PATENT DOCUMENTS

| | | | |
|---|---|---|---|
| 1,352,918 | 9/1920 | Rohbock | 85/50 C X |
| 1,518,550 | 12/1924 | Putnam | 301/9 DN |
| 1,607,274 | 11/1926 | Hecht | 301/9 DN X |
| 1,883,641 | 10/1932 | Eksergian | 301/9 DN X |
| 1,889,837 | 12/1932 | Michelin | 301/36 R X |
| 2,107,925 | 2/1938 | Ash | 301/36 R |
| 2,269,821 | 1/1942 | Kemphert et al. | 301/9 DN X |
| 2,336,767 | 12/1943 | Ash | 301/36 R X |
| 2,516,896 | 8/1950 | Manning | 301/9 DN X |
| 2,533,707 | 12/1950 | Ash | 301/9 DN |
| 2,636,783 | 4/1953 | Candy et al. | 301/36 R X |
| 3,241,589 | 3/1966 | Enders | 151/35 X |

FOREIGN PATENT DOCUMENTS

| | | | |
|---|---|---|---|
| 2204038 | 8/1973 | Fed. Rep. of Germany | 403/370 |
| 144440 | 6/1920 | United Kingdom | 85/4 |
| 119082 | 12/1958 | U.S.S.R. | 301/9 DN |

Primary Examiner—Charles A. Marmor
Attorney, Agent, or Firm—Sellers and Brace

[57] ABSTRACT

A shock and vibration-proof fastener of general application and particularly suitable to hold dual wheels demountably assembled to a cargo vehicle hub. The fastener is designed to isolate the threads thereof from radial and torsion stresses utilizing a split collet encircling the shank of the fastener with its periphery converging toward the collet ends at angles of the order of 4 to 1 relative to the collet axis and having a nesting interference fit with a similarly tapered bore through the parts or wheels to be clamped together. The fastener shank has a threaded well in one end mateable with a cap screw having a self-aligning conical surface on the underside of its head engaging the rim edge of a loose fitting washer. The self-aligning surfaces are preferably provided with a ring of teeth and notches interengaging along helical surfaces having a pitch substantially greater than that of the fastener threads. This feature, acting in concert with a ring of shallow teeth on the washer face in contact with the parts being clamped, positively safeguards against loosening unless unwrenching forces are applied to the washer.

27 Claims, 10 Drawing Figures

SHOCK PROOF FASTENER ASSEMBLY FOR VEHICLE WHEELS AND OTHER APPLICATIONS

This application is a continuation-in-part of my co-pending application for Letters Patent Ser. No. 623,578, filed Oct. 20, 1975, entitled SHOCK PROOF FASTENER ASSEMBLY FOR VEHICLE WHEELS AND OTHER APPLICATIONS, now abandoned.

This invention relates to fastener assemblies, and more particularly to a unique shock and vibration-proof fastener of general application particularly suitable in withstanding the rigors to which dual wheels of cargo vehicles are subjected.

BACKGROUND OF THE INVENTION

Operating environments using threaded fasteners subject to severe shock, vibration and abrupt load changes have challenged the efforts of designers for many years. Under these and the like conditions it is extremely difficult to safeguard against loosening and premature failure of the fastener with attendant serious consequences to the structure and to the safety of persons in the vicinity.

Demountable dual cargo wheel assemblies present particularly frustrating and vexatious problems because of the unusually severe shock, vibration and stress reversal conditions encountered in normal every day usage. These wheels are secured to the hub by a ring of threaded fasteners typically embodying a threaded stud fixed to the hub and brake drum unit and to which fasteners the very heavy wheels are secured. The fastener receiving holes must be appreciably larger than the diameter of the fastener shanks to permit assembly and disassembly of these heavy wheels without special equipment. This essential and mandatory radial clearance permits limited relative rotary movement between the hub and the wheel during both vehicle propelling and braking of the wheels. Likewise, this radial clearance permits limited relative movement between the wheel and the hub while travelling over rough ground, across pot holes and the like. These several and distinctly different types of relative movement cause wear in progressively increasing amounts with usage and results inevitably in the loosening of the fasteners.

Another equally serious cause of fastener loosening is the fact that prior fastener assemblies are so constructed as to pass major portions of the operating stresses through the fastener threads. Such threads unavoidably, are subject to widely varying manufacturing tolerances and the severe ever-changing load stresses must be transmitted across the loose ill-fitting threads. Additionally, the threads deflect under stress thereby augmenting the permissible play and introducing further thread-loosening forces.

A proposal made to counteract several adverse characteristics of dual wheel assemblies are disclosed in Eksergian, U.S. Pat. No. 1, 883,641. In a first embodiment this patentee proposes a collet surrounding the hub studs. The exterior of this stud and the base of the fastener nut are similarly beveled at a taper angle of 1 to 1 to internest with the similarly beveled bores of the fastener mounting holes in the wheel. Additionally, the nave of the wheel disc through which the fastener studs pass is made of resilient material and formed with annular channels facing one another with their radially spaced rims in abutting contact. According to the concept changing load stresses cause these resilient annular sections to flex axially of the fasteners to maintain the fastener threads under high loads irrespective of changing loads encountered in usage. in a second embodiment Eksergian suggests that this resilient mode of maintaining the fastener threads preloaded is sufficient to eliminate the need for his contractable collet. However, neither of these expedients is useful in practice for reasons self-evident from the fact that cargo wheel discs are customarily from one-half to ¾ of an inch or more in thickness.

Manning, U.S. Pat. No. 2,516,896 proposes a single collet ring assembled concentrically of the hub itself and intended to be contracted against the hub by tightening of the hub fasteners. However, Manning lacks means for eliminating the necessary radial play between the wheel and its mounting studs with the attendant wear unavoidably associated with this play and the cumulative effect of this play on the loosening of the hub nut. Additionally, his stud threads are exposed to severe hazards during mounting and demounting of the wheels.

Putnam, U.S. Pat. No. 1,518,550 recognizes the advantage of using internally threaded studs in combination with cooperating cap screws. However, only a small fraction of the wheel bore seats on the stud and the remainder of the multi-part wheel disc lies beyond the end of the stud. No provision is made for eliminating the relative torsional movement between the hub and the wheel unavoidable because of the necessary clearance between the studs and the stud mounting openings in the wheel.

Another prior attempt to eliminate relative movement between the vehicle wheel and its hub is shown in Hecht, U.S. Pat. No. 1,607,274. His proposal requires mounting one of the dual wheels directly on the brake drum by one set of fasteners and the other wheel directly on the wheel hub itself by stud nuts having tapered segmental parts held loosely captive on the nut. It is impossible to retain but one of the dual wheels to the hub by such a fastener expedient.

Some of the foregoing and other prior proposals endeavor to lock out the very considerable degree of play between the hub studs and the wheel mounting holes using a lug nut having a semi-spherical or steeply tapered inner rim nesting into a similarly shaped socket at the outer end of the mounting bore hole in the wheel. This merely assures that the heavy radial and torsional load forces are transmitted to the hub through the threads of the studs and lug nuts.

Ash U.S. Pat. No. 2,336,767 provides a fastener for securing only a single demountable wheel to the hub using two collets each having a taper angle of 1 to 1. The inevitable result is that this steep angle directs wheel shock and load forces into the hub via the stud and lug nut threads. It is well known that this is a major cause of fastener loosening.

Other U.S. Pat. Nos. showing the extensive work done by numerous designers in attempts to provide a foolproof and shock-proof wheel assembly include Hunt 1,858,827; Michelin 1,889,837; Hunt et al. 1,910,250; LaBrie 1,914,996; Ash 1,939,641; Crowther 1,940,675; Zerk 2,123,130; Eksergian 2,161,740; Eksergian 2,217,646; Ash 2,533,707; Eksergian 2,597,835; Candy et al. 2,636,783; Hedlund et al. 2,877,054; Hykes 2,925,304; and Verdier 3,386,771.

SUMMARY OF THE INVENTION

The present invention overcomes the many shortcomings and disadvantages pointed out above and including others typically present in prior shock-proof fasteners and vehicle wheel mounting devices. The invention fastener embodies a unique design successfully isolating all shock vibration and operating load forces from transmission into the hub through the fastener threads. The wheel mounting bores are sufficiently larger than the mounting studs to facilitate rapid assembly of the wheels over the studs, the latter having an exposed length not greater than the combined thickness of the dual wheel discs. Additionally, the stud threads are located in axial wells where they are completely shielded from the risk of injury while mounting and demounting the wheel.

The stud seating bores are tapered at a shallow angle preferably not in excess of 20° to the bore axis and conveniently expressed as a taper angle of the order of 4 to 1. This shallow taper is within or less than the angle of friction with the result that none of the shock and load forces are transmitted axially of the studs. Split resilient collets loosely embrace each stud and have oppositely tapering peripheries compelemental to the shallow wheel bore tapers and are preferably so sized that tightening of the stud nuts contract these collets firmly and rigidly against the studs before the adjacent faces of the parts or the wheel contact one another. This assures elimination of radial play between the wheel bores, the collets and the studs. During assembly the collets have a loose fit over the stud shanks. The collets are preferably made of resilient material and have a slightly undulating or sinuous configuration circumferentially thereof to minimize frictional contact between the juxtaposed surfaces and to facilitate separation of the parts during disassembly. The use of a threaded well axially of the studs provides complete protection for the threads and very substantially reduces the length of the studs and makes it feasible to utilize the collets to properly center the inner wheel prior to assembly of the outer wheel.

The clamping part of the fastener comprises a cap screw having its head mating with the shank through a frusto-conical surface which seats against the rim edge of a cooperating washer to provide a self-aligning clamping assembly. In one preferred embodiment, the frusto-conical surface on the head of the cap screw is formed with a ring of teeth having helical surfaces the pitch of which is substantially greater than the pitch of the fastener thread. These teeth cooperate with a ring of shallow notches in the adjacent rim edge of the washer bore and with a ring of shallow teeth on the remote face of the washer to form a shock and vibration-proof assembly incapable of loosening except by unwrenching forces applied to the washer.

Each of the dual wheels is of identical construction and either may be mounted innermost. Assembly is facilitated if both ends of the stud seating bores are tapered at generally similar angles although only one of the tapered ends is in load bearing contact with the collets irrespective of the wheel location in the assembly. Owing to the very shallow taper employed, the inner wheel may resist disassembly. This is overcome by the provision of two or more threaded bores through the wheels near the stud bores into which pry-off cap screws may be inserted to initiate disassembly of the collets.

Accordingly, it is a primary object of this invention to provide a unique shock-proof fastener for clamping a plurality of parts tightly assembled and immune from loosening under the most severe and rigorous operating conditions.

Another object of the invention is the provision of a shock-proof fastener so constructed as to isolate the fastener threads from the path of the load forces acting between the fastener shank and the parts secured together thereby.

Another object of the invention is the provision of a demountable dual vehicle wheel assembly utilizing a contractable load transmitting collet between the fastener shank and each of the dual wheels having oppositely tapering surfaces on its exterior internesting with tapered stud seating surfaces on the wheels wherein the taper angle of the tapering surfaces is of the order of Another object of the invention is the provision of a demountable dual vehicle wheel assembly having a ring of studs projecting therefrom a distance no greater than approximately the combined thickness of the dual wheels and having threaded axial wells seating clamping cap screws cooperating with split collets having oppositely tapered exteriors internesting with shallow angle stud seating bores in the wheels, cooperating when assembled to isolate the stud threads from radial and torsional load forces.

Another object of the invention is the provision of a resilient split collet for use in a shake-proof fastener assembly and having a sinuous configuration and an oppositely converging exterior surface.

Another object of the invention is the provision of a vehicle dual wheel mounting hub having a ring of studs projecting therefrom for a distance not greater than the thickness of a pair of wheels mounted thereover and having a threaded axial well supporting a threaded cap screw and washer assembly.

Another object of the invention is the provision of a demountable wheel usable in pairs and having a ring of oversized stud receiving bores having an annular surface tapering at an angle to the bore axis of 15° to 20° and adapted to seat on a complementally shaped surface of a split resilient collet.

These and other more specific objects will appear upon reading the following specification and claims and upon considering in connection therewith the attached drawing to which they relate.

Referring now to the drawing in which a preferred embodiment of the invention is illustrated:

FIRST PREFERRED EMBODIMENT

Figure 1:
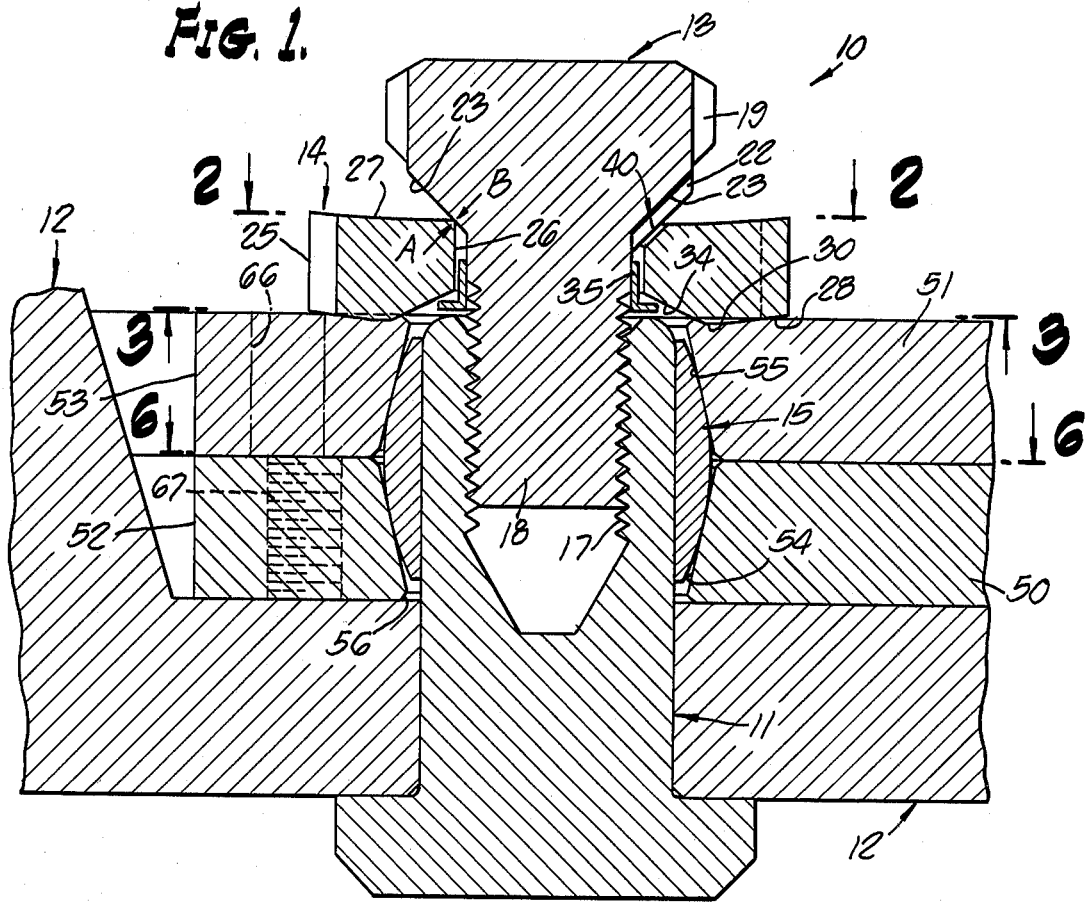
FIG. 1 is a cross-sectional view of one illustrative embodiment of the invention fastener in use to clamp demountable dual wheels to a vehicle wheel hub.
Figure 2:
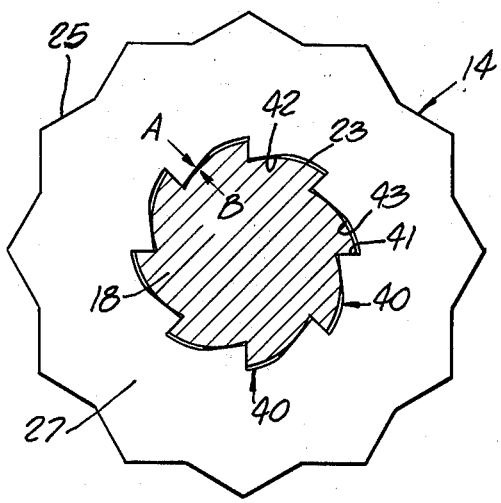
FIG. 2 is a cross-sectional view of the fastener taken radially of the hub along line 2—2 on FIG. 1.

Referring initially more particularly to FIGS. 1 to 4, there is shown an illustrative embodiment of the invention shake-proof fastener assembly employed to clamp demountable dual wheels to a vehicle hub unit. It will be understood that this is merely one of innumerable operating environments equally suited to utilize the principles of this invention. The fastener assembly, designated generally 10, includes a stud or shank 11 preferably fixed to a wheel hub or a vehicle brake drum 12, a cap screw 13, a washer 14, and a split collet 15.

Shank 11 is here shown as rigidly fixed to hub 12 but it will be understood that it may be part of a headed bolt separable from its supporting element which may be one of the parts being fastened together. As shown, the exposed portion of shank 11 extends beyond one face of the hub or brake drum 12 by a distance preferably not in excess of the combined thickness of the parts being clamped such as the dual wheels. In other applications of the invention fastener, the shank may be extended and threaded to receive a threaded nut. As herein shown, the outer end of each shank or stud 11 has a chamfered outer rim edge and a threaded well 17 mateable with the threads of the shank 18 of cap screw 13. The structural details of cap screw 13 and its washer 14 and the manner in which these two parts cooperate with one another and the parts being secured together in a shake-proof manner are described in detail in my U.S. Pat. No. 3,926,237, dated Dec. 16, 1975. A principal difference between the showing of these parts in this specification and in my patent resides in the fact that the head of cap screw 13 herein is provided with a 12 point double hex exterior 19 designed to seat a 12 point socket wrench.

Figure 4:
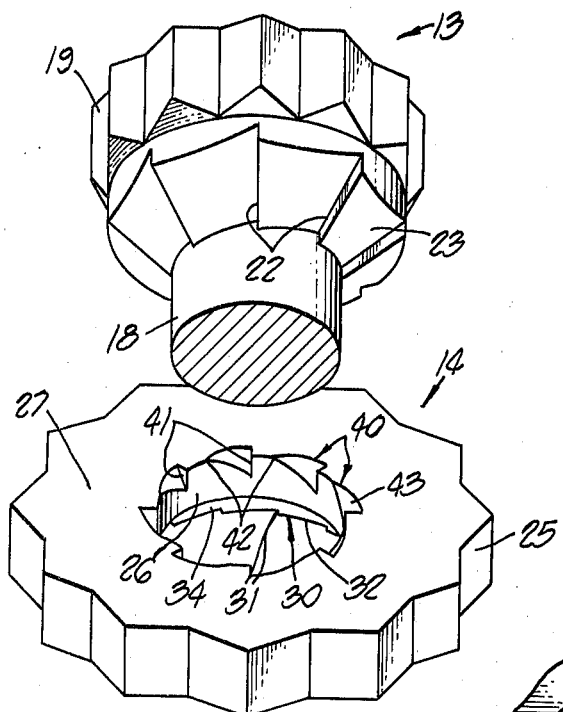
FIG. 4 is a fragmentary perspective view of the fastener retainer and the cooperating washer usable therewith and showing salient features of their respective structural details.

Referring to FIG. 4, it will be recognized that the underside of the cap screw head is forged or suitably formed with a generally conical under-surface converging at its smaller end into the shank of the cap screw at a suitable angle such as 45°. This surface is formed in a forging or cold working operation to provide a ring of cam teeth each having a relatively short radial face 22 and a relatively long helical camming face 23 interconnecting the crest of one tooth and the root end of the next adjacent tooth. The helical surface 23 has a pitch of the order of double the pitch of the threads on shank 13 and extending in the same direction as the pitch of the shank threads.

Figure 3:
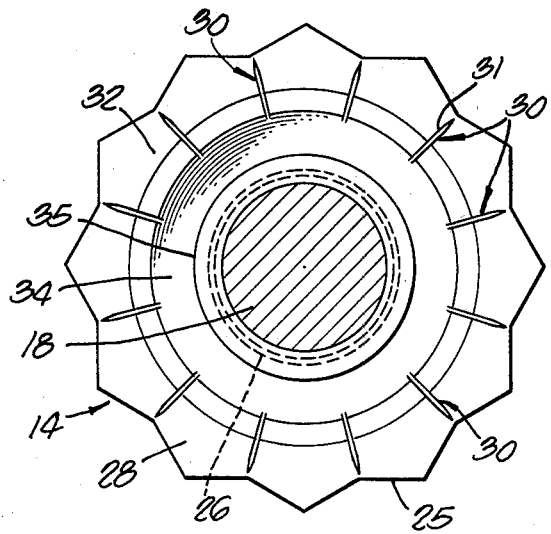
FIG. 3 is a cross-sectional view taken along line 3—3 on FIG. 1.

Washer 14 also has a double hexagonal perimeter 25 and a substantially cylindrical central opening or bore 26. Washer 14 must be made of very hard tough material such as SAE 43-40 chromalloy having an RC50 or more rating, or any other material having like or superior characteristics. Bore 26 is formed in a punching operation which may be performed in such manner as to dish the washer to a shallow degree thereby providing a concave outer end surface 27 and a convex undersurface 28 (FIG. 1). Whether or not the washer is dished, it is assembled to the cap screw with surface 28 facing the threaded end of the cap screw. Convex surface 28 is forged or upset to provide a ring of shallow barb-like sharp-edged teeth 30 extending generally radially of the washer. The sharp crest of teeth 30 lie between and interconnect a very shallow substantially upright wall 31 and a relatively long acutely inclined camming surface 32 (FIG. 3). The surface 32 extends circumferentially of the washer and serves as a camming surface effective to cause the washer to ride over the surface of the work piece while the washer is being rotated along with the cap screw 13 during tightening of the latter. However, if there is any tendency for the fastener to counterrotate in a loosening direction after being tightened, the sharp crests of teeth 30 instantly dig into the juxtaposed surface of the work piece and prevent the washer from loosening. Since teeth 30 are formed in the shallow convex surface 28 the outer ends of their crests may feather out and merge with the convex surface in an area near the outer periphery of the washer. The inner ends of the teeth, as here shown, terminate flush with the sidewall of an annular recess 34 sized to accommodate a keeper ring 35 having a press fit with the shank of cap screw 13 thereby holding the washer properly assembled to the cap screw with the shallow teeth 30 facing toward the parts to be clamped.

The rim edge of bore 26 at the end thereof adjacent end face 27 is forged, broached or otherwise formed with a ring of shallow notches 40 having tapering bottoms converging inwardly toward the convex end face of the washer and are appreciably deeper at their leading ends than at their trailing ends. The leading end of each notch 40 merges with a relatively short radially disposed end wall 41 whereas the trailing shallow portion 42 of each notch is designed to seat against and have load bearing contact with the juxtaposed deep end portion of the helical camming surface 23 of the teeth formed on the underside of the head of cap screw 13.

The tapering bottom surface 43 at the deep end of each notch 40 is inclined toward the convex end surface of the washer at an angle which is preferably a few degrees in excess of the angle of surface 23, as for example, 47° to 49°. As shown in FIG. 4, the lateral edges at both ends of notches 40 converge and merge with the adjacent rim edge of central washer opening 25. This is equally true of the lateral edges of notches 40 forming the radial end walls 41 and of the long lateral edges at the narrow end of the generally helical surfaces 43. The last mentioned edges of notches 40 may merge with the rim edge of opening 26 substantially at the edge of end wall 41 of the adjacent notch as is shown in FIG. 4, or at a point on the rim of the opening spaced a substantial distance therefrom.

The major load bearing portion 42 at the shallow end of notches 40 is preferably spaced somewhat in advance of the shallowest portion of the notches 40 as, for example, one fifth of the arcuate distance to the radial end wall 41 at the deepest end of that notch. The major portion of the bottom surface 43 preferably lies radially outwardly of the helical surface 23 on the head of the cap screw when the latter is in its fully assembled tightened position. For this reason this major portion of the notch bottoms need not be made to close tolerance specifications, it being desirable that the surface lie out of contact with surfaces 23 of the notches in the retainer 13.

Figure 5:
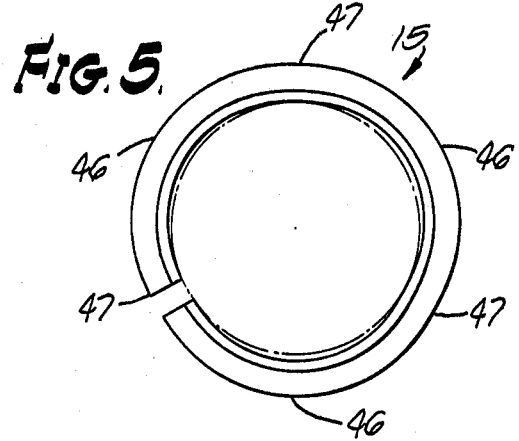
FIG. 5 is an end view of one preferred spring collet construction.

Collet 15, best shown in FIGS. 1 and 5, comprises a split ring of high strength tempered resilient material. Collet 15 may be formed from strip stock having one flat face and a bevelled or crowned surface on its opposite side. This stock is rolled into a split ring and subjected to a forming or forging operation in which alternate circumferential sections are slightly offset from one another in opposite directions as, for example, by a radial distance of ten to 15 thousandths, or more if desired. As shown by way of example in FIG. 5, three portions 46 of the ring body are offset inwardly whereas the intervening three portions 47 are offset outwardly. In other words these portions are gently wavy. This sinuous or undulating configuration of the collet, taken with the resilient characteristic of the material, permits the collet to accommodate an adequate range of manufacturing tolerances and facilitates disassembly of the parts as well as axial shifting of the collet during tightening of the fastener. No attempt has been made to illustrate the sinuous or undulating character of the collet when assembled owing to the small dimensions involved. The axial length of collet 15 is no greater than the combined thickness of the parts being clamped together and is preferably slightly less than this thickness.

The parts clamped together in FIG. 1 comprise a pair of idential dual wheel discs 50,51. It will be understood that such wheel discs are normally encircled by pneumatic tire mounting rims, not shown, but of any suitable character. The central portions of the wheel discs 40,41 have planar parallel faces and central openings 52,53 sufficiently large to receive the customary axle mounting portion of the vehicle hub 12. Fastener or lug bolt shanks 11 are fixed to this hub structure concentrically of its axis and each wheel disc is provided with a ring of oversized tapered bores or openings 54,55 sized and positioned to be assembled readily over the outer ends of shanks 11. Bores 54, 55 extend from face to face of the wheel discs 50,51 and are therefore aptly described as unidirectional tapered bores. The taper angle of these bores relative to the axis of the holes is less than the angle of friction and preferably less than 20°. For many metal materials the angle of friction is approximately 15°. If the taper angle is substantially in excess of the angle of friction there can be an axial force component effective to shift the collet axially. On the other hand if the taper angle is at or less than the angle of friction then there is no axial component tending to shift or to separate the parts.

For convenience, the small taper angle of bores 54,55 may be expressed as a ratio of the order of 4 to 1. The exterior surface of collets 15 likewise preferably converges toward their opposite ends at angles having approximately the same taper ratios as bores 54,55.

Figure 8:
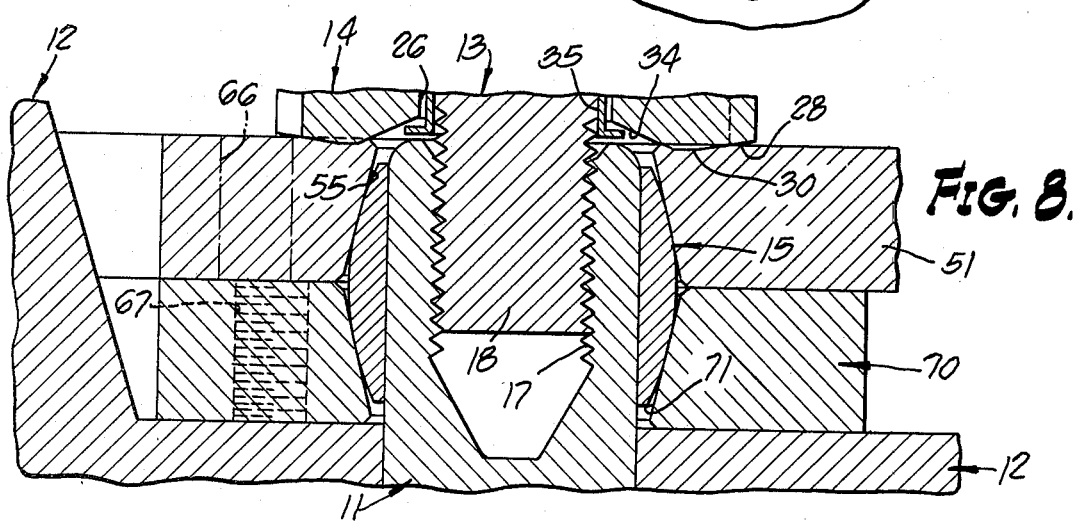
FIG. 8 is a fragmentary cross-sectional view generally similar to FIG. 1 but showing an adapter ring substituted for one of the tandem wheels.

It will be understood that the taper of bores 54,55 preferably extends substantially throughout the axial length of the bore through the part, although one or both rim edges of the bore may be chamfered or deburred as indicated at 56. To facilitate assembly, the outer periphery of collet 15 is transversely crowned or provided with oppositely tapering ends, the taper angle preferably being greater than that of bores 54,55 to provide a pilot facilitating the initial assembly of the collet and the cooperating parts. The collet may be crowned or bevelled along either a spherically or conicaloy contoured surface. As shown in FIGS. 1 and 8 the exterior surface of the collet is essentially spherical.

Figure 6:
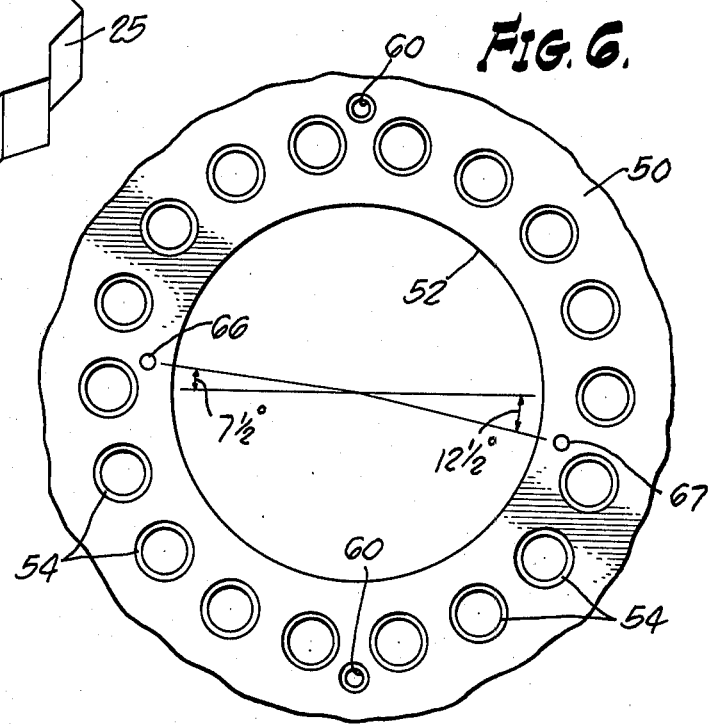
FIG. 6 is a fragmentary plan view of the demountable wheel disc per se as viewed along line 6—6 on FIG. 1.
Figure 7:
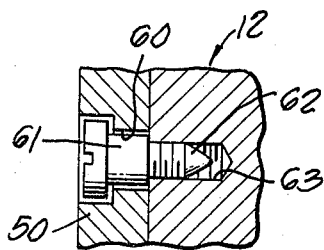
FIG. 7 is a cross-sectional view through a locator cap screw in use to hold a wheel disc concentrically of the hub while the collets are being assembled over the fastener shanks.

Referring to FIG. 6, the inner rim portion of the inner wheel disc 50 has a ring of oversized tapered openings 54 suitable in number for use in mounting a heavy duty truck wheel to the vehicle hub. Since holes 54 are oversized to facilitate mounting the wheel disc over fastener shanks 11, the heavy wheel disc preferably includes a pair of locator holes 60,60 diametrically opposite one another useful in holding the inner wheel temporarily out of contact with shanks 11. For this purpose, holes 60 are recessed at their outer ends to receive the head of a shouldered locator cap screw 61, the shoulder being properly positioned to leave the wheel disc loose for limited movement when the shoulder bottoms against the hub. The inner end 62 of this screw is conical to facilitate its assembly into one of the threaded wells 63 (FIG. 7) in the face of wheel hub 12. The shank of cap screw 61 has a close fit with opening 60 in order that when screw locator 60 is assembled into well 63 the inner wheel disc will be accurately positioned out of contact with studs or shanks 11. The insertion of one of the locator screws 61 centralizes at least half of the wheel disc in such manner that the fastener shanks on the adjacent half are generally centered in bores 54. By inserting a second one of the locator screws on the opposite side of the wheel disc the remaining half of the bores are likewise centered relative to the remainder of the fastener shanks.

As shown in FIG. 6, each wheel disc is provided with a pair of threaded bores 66,67 on generally diametrically opposite sides of hub openings 52. Threaded bore 66 is spaced 7½° from one side of the wheel diameter whereas bore 67 is spaced 12½° from the opposite sides of the same diameter line. Since one wheel must be inverted relative to the other in a dual wheel mounting, this disposition of the bores 66,67 assures that these openings in one wheel disc will not be in registry with the similar bores in a second wheel disc when the two wheels are mounted on the same hub. Thus, the operator inserts suitable cap screws in bores 66,67 to pry or force first one and then the other wheel off collets 15 when demounting the wheels. Although a pair of bores for pryoff screws are shown, it will be understood that three or more may and preferably are used and so located that the pryoff bores in the outer wheel are out of alignment with the pryoff bores in the inner wheel.

Referring to FIG. 8, there is shown an adapter ring 70 which is provided with a ring of tapered bores 71 identical in number, size and location with the tapered bores 54,55 in the wheel discs. Adapter ring 70 has a thickness corresponding with the thickness of a wheel disc and is usable in lieu of a wheel disc if the user wishes to leave either wheel off a dual hub unit. Thus, if one or the other of the wheel discs is not in use the adapter ring 70 is mounted over the fastener shanks in lieu of that wheel and cooperates with collets 15 in the same manner as though the second wheel were present. Adapter ring 70 may be mounted in place of either the inner or outer wheel disc the former mode of assembly being preferred and shown in FIG. 8. It will be understood that adapter ring 70 includes locator bores 60,60, and threaded bores 66,67 having the same purpose described above in connection with the corresponding bores in the wheel disc.

Second Preferred Embodiment

Figure 9:
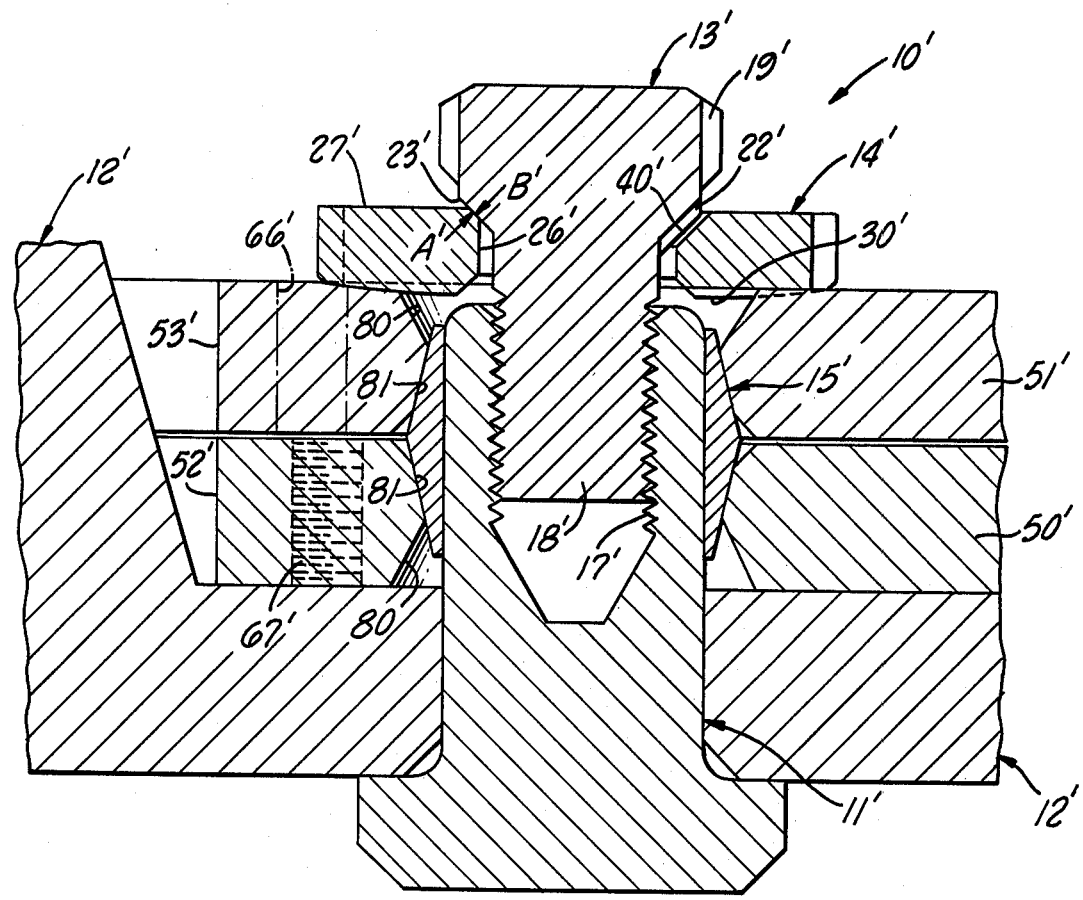
FIG. 9 is a cross-sectional view of a second illustrative embodiment of the invention fastener in use to clamp demountable dual wheels to a vehicle wheel hub using the same cap screw and washer as shown in FIGS. 1 to 8.

A second embodiment of the invention is shown in FIG. 9 and differs from the first described embodiment illustrated in FIGS. 1–8 in two principal respects, namely, the stud receiving bores for the wheels diverge toward the opposite ends of the bores and the exterior of the split collet converge along conical surfaces rather than being bevelled. Accordingly, the same reference characters are used to designate the same or similar components as in FIGS. 1–8 but are distinguished therefrom by the addition of a prime. All structural and functional details of the studs 11′, hub and brake drum unit 12′, cap screw 13′, and the washer 14′ are identical with those described above including the structural details of the cap screw head and washer shown in FIGS. 2 and 3. For these reasons a description of these details need not be repeated here. Likewise, the only difference between the split ring collet 15′ and that described above resides in the fact that the exterior surface converges conically toward the opposite ends with a taper of the order of 4 to 1 relative to the collet axis.

Wheel discs 50′,51′ are generally similar to those described in the first embodiment in that the stud receiving bores may be punched to a size approximating the diameter at the midlength of the bores. Thereafter the opposite ends of these bores are reamed with a diverging conical surface 80,81 tapering generally similarly. The conical surface 81 is preferably reamed to be complemental to its seating surface on collet 15′ in the assembled position of the wheels on hub 12′. The conical surfaces 80 are here shown as having a similar taper but this surface serves only as a piloting surface during assembly of the wheels over the studs and need not be made to the same tolerance specifications since it serves primarily as an assembly pilot to facilitate mounting of the wheel over the studs. It will be noted from a comparison of FIGS. 1 and 9 that the smallest diameter portion of stud receiving bores in FIG. 9 is somewhat larger in diameter than the smaller end of the bores in FIG. 1, but more importantly the diverging conical surface 80 provides a large diameter flaring pilot or guide greatly facilitating assembly of heavy cargo wheels over studs 11′.

Third Preferred Embodiment

Figure 10:
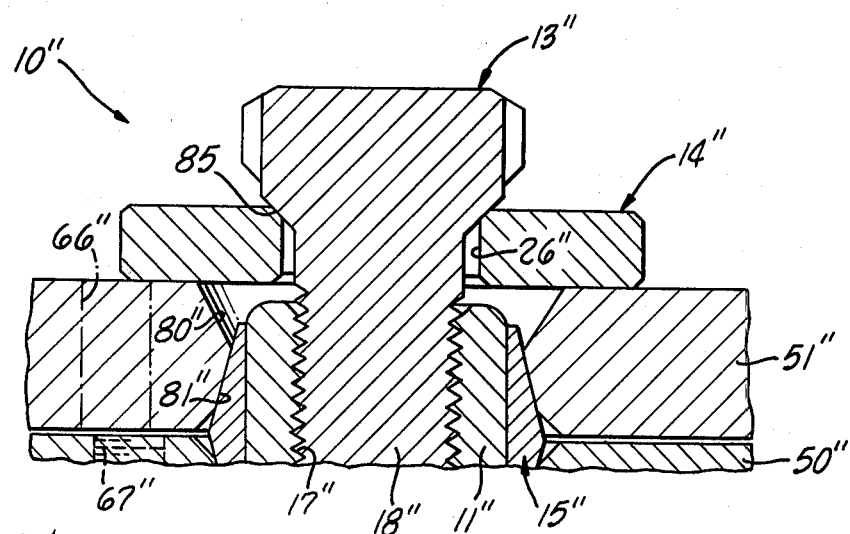
FIG. 10 is a cross-sectional view of a third illustrative embodiment differing from that shown in FIG. 9 in using a simplified cap screw and washer.

A third embodiment of the invention shown in FIG. 10 differs from that described above in connection with FIG. 9 in using a simpler, less expensive cap screw and washer. Some portions are not shown in full but it will be understood that these features correspond with those described above in connection with FIG. 9. The same or similar features are designated by the same characters as in FIGS. 1–8 but are distinguished by the application of a double prime.

The underside of the cap screw head converges with the cap screw shank 18″ along a conical surface 85 at a suitable taper angle such as 45°. Washer 14′ is a simple circular washer without a wrench-engaging perimeter or notches corresponding to notches 40 and 40′. The rim edge of its bore 26″ may be relieved to mate with the conical surface 85 on the cap screw head. Likewise, the lower surface of washer 14″ is planar and free of the sharp edged teeth 30,30′ present in the first two embodiments.

Thus, the third embodiment lacks the shake-proof features of FIGS. 1–9 but its bore 26″, like the corresponding bores of the FIGS. 1–9 washers, is substantially larger than the cap screw shank 80″. Hence, it will be apparent and understood that the substantially larger bores in each of the washers than the cap screw shanks renders each of these fastener assemblies self-aligning. Accordingly, the undersurface of each of the washers always lies parallel with and flush against the adjacent surface of the outer wheel.

To be noted in FIGS. 9 and 10 is the fact that, in each, the adjacent faces of the dual wheels in their assembled position are preferably slightly spaced from one another thereby assuring that when the fasteners are fully tightened the wheels are not in contact with one another. In consequence, each wheel is free to assume a position on the collets desirable and necessary to contract the collets firmly against the studs. This expedient, acting in concert with other features of the fastener assembly, is found so reliable and satisfactory, that some users elect to dispense with the vibration and shake-proof features afforded by the special washer and cap screw of the first two embodiments.

Assembly and Operation

The assembly and operation of the described fastener assembly will be readily understood from the foregoing detailed description of the structural and functional details of the three illustrative embodiments. In assembling dual wheel discs over a ring of lug bolts 11 secured to a wheel hub or brake drum assembly, the operator assembles the inner wheel disc over the hub while this hub is rotated as shown in FIG. 6 to place the threaded locator bores 63 and the hub axis in a common vertical plane as shown in FIG. 6. The wheel is maneuvered if necessary so that first one and then the other of the locator screws 61 can be assembled through bores 60 into threaded wheels 63 of the hub. Thereupon all of the tapered bores 54 will be positioned concentrically of and out of contact with a respective one of the fastener studs or shanks.

Individual ones of the split collets 15 are then assembled over each shank. The outer wheel disc 51 is next telescoped over the hub and piloted into position over the fastener shanks as the larger ends of tapered bores 55 telescope over the reduced outer ends of the collets.

Alternatively, the collets readily serve to position the inner wheel by positioning them over the studs and tapering them progressively thereby to cam the inner wheel into its approximate position axially of the hub and each of the wheel clamping studs. Thereafter, the outer wheel is telescoped over the outer ends of the collets.

The operator then assembles cap screws 13 and washers 14 into the threaded well 17 of each of the shanks, and wrenches them tight in the customary manner. During this operation the radial surfaces 22 on the underside of the screw head engage the radial walls 41 at the inner ends of notches 40 and rotate the washer along the screw 13 as each is tightened. The shallow sharp-crested teeth 30 on the under surface 28 of the washer glide over the outer surface of the adjacent wheel disc 51 owing to the camming action of the long helical surface 32 of teeth 30. Upon any tendency of the screw to rotate in a loosening direction sharp edges 31 dig into the wheel disc surface and positively hold the washer against rotation.

When the shock-proof fastener is fully tightened the load forces acting between the screw and the shank are transmitted between the washer and the screw along the point of contact provided between the shallow end of notches 40 and the adjacent deep end portion of the helical surfaces 23. One of these numerous load transfer points is indicated by the arrows A and B in FIGS. 1 and 2, there being as many of these load transfer points as there are notches 40 in the washer. Any tendency of the screw to counter-rotate relative to the shank instantly greatly increases the load stresses on the fastener parts due to the fact that the oitch of the surfaces through which the load forces are transmitted at arrows A and B is very substantially greater than the pitch of the fastener threads.

The components of the dual wheel assembly are preferably so dimensioned that collets 15 are contracted firmly against studs or shanks 11 before the adjacent radial faces of wheels 50,51 come into compressive contact with another. The spacing between the wheels showin in FIG. 1 is illustrative and assures that the collets are fully collapsed against the shanks when the cap screws are properly tightened. Thus, this important condition cannot be thwarted by the wheels being compressed against one another and thereby blocking further contraction of the collets.

Once the collets have been secured fully and firmly collapsed against the studs in the manner described, all relative movement between the hub and the two wheels is positively precluded. This includes both radial movement and torsional or rotary movement caused by either sharp acceleration or sudden braking. Likewise, the fastener threads are isolated from repetitive reversing stresses characteristic of prior fasteners and found conducive to premature loosening and failure.

If only a single part or wheel disc is to be clamped to another part such as the hub, the only change necessary is to employ a collet having an axial dimension not in excess and preferably slightly less than the thickness of the single part being clamped to the hub.

Disassembly of the fasteners is impossible by applying a wrenching force to the fastener head 19. Instead, the fastener can be disassembled only by applying an unwrenching force to the non-circular periphery of washer 14. The sharp crested teeth 30 strongly resist unwrenching but, owing to the low height of these teeth, the washer can be forcibly rotated in an unwrenching direction. As this occurs the radial end walls 41 of notches 40, being already in contact with the similarly shaped walls 22 of the cap screw, are effective to rotate the screw in an unwrenching direction along with the washer.

Owing to the acute taper of bores 54,55 it may be necessary to insert cap screws 61 into holes 66,67 and tighten their pointed inner ends against the underlying hub or brake structure to pry the collets and the inner wheel from the studs 11. A lubricant coating applied to the parts prior to initial assembly may obviate the need for using screws 61 to pry off the inner wheel.

While the particular shock-proof fastener assembly for vehicle wheels and other applications herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. In combination, a fastener assembly for a plurality of parts, comprising:
  a headed fastener having a shank provided with a threaded well axially of the end thereof;
  a split resilient collet having an undulating configuration circumferentially thereof and sized to have a slip fit over said shank and an outer surface tapering to a smaller diameter at its opposite ends at shallow taper angles of the order of 4 to 1 and no greater than 20°;
  a pair of members clampable immovably to said shank each having a bore tapered substantially from end to end thereof in the same direction at a taper angle of the order of 4 to 1 and sized to have an interference telescopic fit over a respective end of said collet and the smaller diameter portion of said bore being substantially greater than the diameter of said shank; and
  said headed fastener including a cap screw having threads mateable with said threaded well effective as the same is wrenched to compress said pair of members toward one another about a respective tapered portion of said collet thereby contracting said collet firmly and rigidly against said fastener shank.

2. The combination defined in claim 1 characterized in that said collet has an axial length less than the combined thickness of said pair of members.

3. The combination defined in claim 1 characterized in that the portion of said fastener shank embraced by said pair of members is not in excess of the combined thickness of said pair of members.

4. The combination defined in claim 1 characterized in that the length of said fastener shank embraced by said pair of members is less than the combined thickness of said pair of members.

5. The combination defined in claim 1 characterized in that the end of the head of said headed cap screw diverges outwardly from the shank thereof to provide a self-aligning generally conical surface, and a washer having a bore the diameter of which is substantially larger than the diameter of said shank interposed between the generally conical surface of said cap screw and the juxtaposed surface of one of said pair of members.

6. The combination defined in claim 5 characterized in that said generally conical surface is formed with a ring of teeth engageable with generally similarly shaped notches on the adjacent rim of said washer bore, said teeth and notches having juxtaposed helical surfaces in load bearing contact and having a pitch substantially greater than the pitch of the threads of said threaded well, said washer having low-height generally-radially disposed teeth on the end face thereof engageable with the juxtaposed one of said pair of members being clamped and shaped to dig into said member to resist loosening of said fastener assembly whereby said assembly can be disassembled only by applying a wrenching tool to said washer.

7. The combination defined in claim 1 characterized in that the components of said fastener assembly are so proportioned that the adjacent faces of said pair of members are not in pressure contact with one another when the cap screw of said fastener assembly is wrenched to the fully tightened position thereof to contract said collet firmly and rigidly against said shank.

8. That improvement in a demountable dual wheel and hub assembly for a motor vehicle which comprises:
  a wheel and brake drum unit having a ring of studs projecting axially from the face of said brake drum each having a threaded well in one end thereof;
  a resilient split collet having a sliding fit over each of said studs and an axial length corresponding generally to the projecting length of said studs, said collet having the exteriors thereof tapering toward their respective ends at a taper angle of the order of 4 to 1;

a pair of wheels having a ring of tapered bores having centers coinciding with the axes of said ring of studs and the taper angle of portions of which bores is of the order of 4 to 1, and sized to internest over and contract said collets firmly and rigidly against said studs, the smaller diameter of said bores being substantially greater than the diameter of said studs; and cap screw means having threads mateable with the threaded well of respective ones of said studs effective as the same are wrenched tight to clamp said wheels immovably to said hub as said collets are contracted rigidly against said studs thereby to isolate the threads of said cap screw means to said threaded wells from radial and torsional load stresses acting between said hub and said wheels when in use.

9. A hub and wheel assembly as defined in claim 8 characterized in that said collets have a sinuous configuration circumferentially thereof.

10. A hub and wheel assembly as defined in claim 8 characterized in that the exposed length of said studs over which said wheels are mounted is no greater than the combined lengths of a pair of said aligned bores through said wheels.

11. A hub and wheel assembly as defined in claim 8 characterized in that the exteriors of said studs are free of threads and generally cylindrical.

12. A hub and wheel assembly as defined in claim 8 characterized in that said cap screw means comprises a headed cap screw and a washer having a loose telescopic fit about the shank thereof, the head of said cap screw merging with said shank along a generally conical surface seating against the adjacent end of the washer bore to provide a self-aligning assembly between said washer and the head of said cap screw.

13. A hub and wheel assembly as defined in claim 12 characterized in that said generally conical surface is formed with a ring of teeth engageable with a ring of generally similarly shaped notches on the adjacent rim of said washer bore, said teeth and notches having juxtaposed helical surfaces in load bearing contact and a pitch substantially greater than the pitch of said threaded well threads, said washer having low-height generally radially disposed teeth engageable with the juxtaposed one of said wheels and shaped to dig thereinto to resist loosening of said cap screws so that disassembly thereof requires applying unwrenched forces to said washers.

14. A hub and wheel assembly as defined in claim 8 characterized in that majors of both ends of said bores through said wheels flare outwardly to facilitate assembly of either of said wheels first over said ring of studs prior to the assembly of said collets over said studs.

15. A hub and wheel assembly as defined in claim 8 characterized in that said collets, studs and the portions of said tapered bores engageable with said collets are sized so that when said cap screw means are fully tightened said collets are firmly and rigidly contracted against said studs before the adjacent faces of said wheels adjacent said studs engage one another whereby said wheels are not in axial compressive contact with one another.

16. A hub and wheel assembly as defined in claim 8 characterized in that said wheels have a plurality of bores therethrough spaced apart circumferentially thereof, and a plurality of cap screws insertable therethrough and into threaded wells in said hub so positioned as to hold the innermost one of a pair of said wheels coaxially assembled to said hub to facilitate the assembly to said collets over said studs and partially into the tapered bores of said innermost wheel.

17. A hub and wheel assembly as defined in claim 8 characterized in that said wheels have a plurality of threaded bores spaced apart circumferentially thereof to receive cap screws operable to aid in the disassembly of a wheel from said ring of studs.

18. That improvement in a demountable dual wheel and hub assembly for a motor vehicle comprising:

a hub and brake drum unit having a ring of studs fixed thereto each provided with a threaded well and cap screw means mateable therewith, the exposed length of said studs being greater than the thickness of one wheel flange but no greater than the combined thickness of the adjacent flange portions of a pair of wheels clampable to said studs;

a resilient split collet for each of said studs having a sliding fit thereover and an axial length not in excess of the exposed length of said studs, the outer periphery of said collets tapering to the remote smaller ends thereof at an angle of the order of 4 to 1;

a pair of wheels having planar parallel faces provided with a ring of tapered bores the smaller ends of which merge in a circle having a diameter substantially larger than the diameters of said studs to facilitate assembly of said wheels thereover, portions of said bores being sized to telescope over an adjacent end of said collets and to contract the same firmly and rigidly against said studs as said cap screw means are wrenched tight whereby radial and torsional forces acting on said wheels in use are isolated from said stud threads and are transmitted through said collets and directly into said studs independently of said stud threads.

19. A wheel and hub assembly as defined in claim 18 characterized in that said collets and said tapered bores are so sized that the adjacent faces of said wheels are spaced apart and not in axial compressive contact when fully assembled and clamped to said studs.

20. A wheel and hub assembly as defined in claim 18 characterized in that the two end portions of said bores taper in opposite directions with their smaller ends merging generally at the midlength of said bores.

21. A wheel and hub assembly as defined in claim 18 characterized in that said collets have undulating configuration circumferentially thereof.

22. A wheel and hub assembly as defined in claim 18 characterized in that said cap screw means comprises a cap screw having a head the underside of which has a generally conical surface converging into the shank of said cap screw, and a washer having a central bore substantially larger than the diameter of said shank with the rim edge at one end bearing against said generally conical surface.

23. A wheel and hub assembly as defined in claim 22 characterized in that said washer has shallow generally radial teeth on the one face engageable with the exterior surface of the adjacent one of said wheels and notches on the rim edge of its bore engageable with teeth formed in said generally conical surface on the underside of said cap screw head, said teeth having a helical surface the pitch of which is greater than the pitch of the threads in said threaded wells and effective to lock said cap screws against dis-assembly except by application unwrenching forces to said washer.

24. A vehicle hub having an outwardly facing planar wheel seating surface for use in securing a pair of tire-supporting wheels thereto, comprising:
   a ring of studs fixed to said hub and projecting from said wheel seating surface for a distance approximating the combined thickness of a pair of wheel discs to be mounted thereover, the outer ends of said studs having threaded wells extending partially along the length thereof;
   a split resilient collet having a loose fit over each of said studs, the periphery of said collets tapering convergingly toward the opposite ends thereof at a shallow taper angle of the order of 4 to 1 relative to the axis of said collet; and
   cap screw means mateable with respective ones of said threaded wells and each including a washer assembled over the shank of a headed cap screw and bearing against a generally conical surface embracing the underside of the cap screw head.

25. A hub as defined in claim 24 characterized in that said generally conical surface on the heads of said cap screws is formed with teeth each having a generally radial surface and a long helical surface of substantially greater pitch than the pitch of the threads in said threaded wells, said washers loosely encircling the shanks of said cap screws and having a ring of notches shaped and positioned to seat a respective one of said teeth, and the end face of said washers remote from said teeth having a plurality of shallow sharp-edged teeth shaped and adapted to dig into the exterior surface of the outer one of a pair of wheel discs when said wheel discs are assembled over said studs thereby to prevent loosening of said cap screws.

26. A hub as defined in claim 24 characterized in the provision of an adapter ring mountable over said studs in lieu of the inner one of a pair of said wheel discs, said adapter ring being rectangular in cross-section and having a thickness corresponding to the thickness of a wheel disc for which said adapter ring is a substitute, a ring of bores through said ring each having a shallow taper angle of the order of 4 to 1 and sized to internest with the inner tapered ends of said collets during tightening of said cap screw means when an outer wheel disc is mounted on said studs.

27. A hub as defined in claim 26 characterized in that said adapter ring is provided with threaded bores to accommodate cap screws effective to pry said adapter ring off said hub unit for replacement by an inner wheel disc.

* * * * *